United States Patent [19]

Asada

[11] Patent Number: 5,525,017

[45] Date of Patent: Jun. 11, 1996

[54] WORK SUPPORT DEVICE OF CAMSHAFT MILLER

[75] Inventor: Koji Asada, Ishikawa, Japan

[73] Assignee: Kabushiki Kaisha Komatsu Seisakusho, Tokyo, Japan

[21] Appl. No.: 318,711

[22] PCT Filed: Apr. 30, 1993

[86] PCT No.: PCT/JP93/00590

§ 371 Date: Oct. 12, 1994

§ 102(e) Date: Oct. 12, 1994

[87] PCT Pub. No.: WO93/22092

PCT Pub. Date: Nov. 11, 1993

[30] Foreign Application Priority Data

May 1, 1992 [JP] Japan ................... 4-029163

[51] Int. Cl.⁶ .................................................. B23C 3/08
[52] U.S. Cl. ........................ 409/197; 82/164; 409/199; 409/219
[58] Field of Search ........................ 409/197, 136, 409/199, 219; 82/106, 162, 164; 451/249, 408

[56] References Cited

U.S. PATENT DOCUMENTS

| | | | |
|---|---|---|---|
| 2,577,277 | 12/1951 | Schuly et al. | 82/164 |
| 3,736,114 | 5/1973 | Okada | 82/164 |
| 4,276,723 | 7/1981 | Tournier | 451/408 |
| 4,346,535 | 8/1982 | Asano et al. | 409/199 |

FOREIGN PATENT DOCUMENTS

| | | |
|---|---|---|
| 4-77781 | 2/1971 | Japan . |
| 57-3715 | 1/1982 | Japan . |
| 61-96632 | 6/1986 | Japan . |
| 61-124341 | 8/1986 | Japan . |
| 63-151235 | 10/1988 | Japan . |
| 2-292102 | 12/1990 | Japan . |
| 4-42338 | 4/1992 | Japan . |

OTHER PUBLICATIONS

PCT Notification of Transmittal of Copies of Translation of International Preliminary Examination Report.

*Primary Examiner*—Daniel W. Howell
*Attorney, Agent, or Firm*—Ronald P. Kananen

[57] ABSTRACT

In a work support device of a camshaft miller in which a plurality of journal portions (3b) of a work (3) to be machined are supported by a plurality of supporting portions (6), (7) from a lower side and a side reverse to a work milling direction, the work support device is constructed such that supporting surfaces of the supporting portions (6) supporting the work from the lower side thereof are inclined towards the other supporting portions (7) supporting the work from the side reverse to the milling direction and wherein a clamp mechanism (10) having clamp arms (13) for pressing the work from the upper side thereof is disposed above the supporting portions.

5 Claims, 5 Drawing Sheets

WORK SUPPORT DEVICE OF CAMSHAFT MILLER

TECHNICAL FIELD

This invention relates to a work support device of a camshaft miller used for mill-machining a camshaft of an internal combustion engine.

TECHNICAL BACKGROUND

A conventional camshaft miller of this kind is provided with a work support device for supporting an intermediate portion of a work (camshaft) to be machined having both ends clamped for enabling the mill-machining with high accuracy.

The conventional work support device of the character described above includes, as shown in FIG. 1 and FIG. 2 being a sectional view taken along the line II—II in FIG. 1, respectively two supporting portions d for supporting, from a lower side thereof and a direction reverse to a milling direction, a plurality of journal portions c being at intermediate portions of a work b which is clamped at its both ends by chucks a, thereby preventing the work b from being deformed and vibrated by the milling reaction force during the milling operation.

The conventional camshaft support device of the above kind is disposed to be movable along an axial direction of the work b rested on a bed, not shown, to adjust an axial height (which means a distance from the supporting surface of the supporting portion d to the center of the work b, and the adjustment thereof is performed by changing the height of the supporting portion) in conformity with a diameter, of a portion having a smaller error within tolerance, of the journal portion c. For this reason, in a case where the work b on a side of the journal portion having a larger error within the tolerance of the journal portion c is clamped between the chucks a and a, certain supporting portions d, for example, those on both end sides, lift upward the work b, and accordingly, the work b is deformed as shown in FIG. 1 and a gap e is formed as shown in FIG. 2 between the journal portion c and the supporting surface of the supporting portion d at the central portion of the camshaft. As a result, there causes a case where the work b is not supported at the central portion of the camshaft, resulting in generation of vibration and noises during the machining and hence degrading the machining accuracy, thus being inconvenient.

Therefore, an object of the present invention is to provide a work support device of a camshaft miller capable of supporting a work without being effected by a difference in an error within tolerance of a diameter of a journal portion of a camshaft and hence being capable of preventing vibrations and noises from being generated during a machining operation to thereby prevent the lowering of the machining accuracy.

DISCLOSURE OF THE INVENTION

In order to achieve the above and other objects, according to a first structure of the present invention, there is provided a work support device of a camshaft miller in which a plurality of journal portions of a work to be machined are supported by a plurality of supporting portions from a lower side and a side reverse to a work milling direction, and which is characterized in that supporting surfaces of the supporting portions supporting the work from the lower side thereof are inclined towards the other supporting portions supporting the work from the side reverse to the milling direction and in that a clamp mechanism having clamp arms for pressing the work from the upper side thereof is disposed above the supporting portions.

According to this structure, the work can be supported without being effected by the difference in largeness of an error within the tolerance of the diameter of the journal portion, hence preventing the vibrations and noises from being generated and preventing the lowering of the machining accuracy.

Further, in the above structure, the inclination angle of the supporting surface of the supporting portion for supporting the work from the lower side will be preferred to be within a range of 10° to 20°, more preferably of 15°.

According to a second structure of the present invention, there is provided a work support device as defined above, in which a roller abutting against the work is rotatably provided for the front end of the clamp arm and an oil applying portion for coating a lubrication oil on an outer peripheral surface of the roller.

According to this structure, the journal portion is prevented from being heated and wearing even if the work is rotated with the journal portion being clamped.

According to a third structure of the present invention, there is provided a work support device defined above, in which hydraulic pressures of different values are supplied to the clamp cylinder for swinging the clamp arm by means of an electromagnetic valve for weak-clamping and an electromagnetic valve for strong-clamping.

According to this structure, it is possible to make weak the clamping force at an initial stage at which the lubrication oil can not be sufficiently supplied to the roller and the journal portions, thus generating no wear to the journal portions and the supporting portions.

BRIEF DESCRIPTION OF THE DRAWINGS

The present invention will be more clearly understood from the following detailed description made with reference to the accompanying drawings representing an embodiment of the present invention and the disclosure thereof. Further, it is to be noted that the described embodiment does not intend to specifically define the present invention and is merely described for the easy understanding thereof.

In the accompanying drawings.

BEST MODE FOR EMBODYING THE INVENTION

Figure 1:
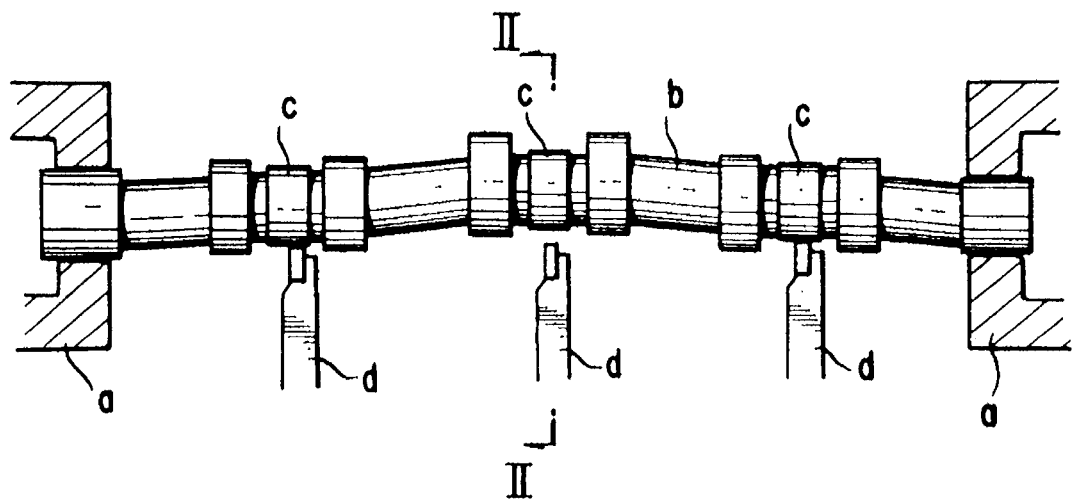
FIG. 1 is a front view of a work support device of conventional camshaft miller.
Figure 2:
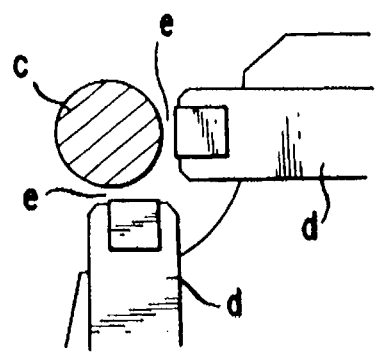
FIG. 2 is a sectional view taken along the line II—II in FIG. 1.

Hereunder, a work support device of a camshaft miller according to a preferred embodiment of the present invention will be described with reference to FIGS. 3 to 7.

In these figures, reference numeral 1 denotes a body of a work support device, which is disposed, to be movable in an axial direction of a work 3, on a bed 2a of a camshaft miller 2 inclining downward in a forward direction.

Reference numeral 4 denotes a chuck disposed both end portions of the camshaft miller 2 so as to clamp both the ends of the work 3 to be machined to rotate the work 3 in one direction. Reference numeral 5 denotes a cutter for machining a cam portion 3a of the work 3.

The work support device body 1 has a plurality pairs of supporting portions 6 and 7 respectively supporting a plurality of journal portions 3b disposed at a plurality of portions, for example, three portions in the illustration, of the work 3. One group 6 of supporting portions 6 and 7 are positioned below the work 3 and provided with pads 6a at top portions thereof, and each of the pads 6a has an upper surface inclining by for example 15° with respect to a horizontal plane passing the center of the work 3 on the side of the supporting portion 7. The other group 7 of the supporting portions 6 and 7 are disposed to the opposite side of the cutter 5 for supporting the work 3 from, for example, a horizontal direction. Each of the supporting portion 7 is provided at its front end portion with a pad 7a having a center biased upward from the horizontal line passing the center of the work 3.

A clamp mechanism 10 pressing the work from an upper direction is disposed above one pair of the supporting portions 6 and 7, in all the supporting portions 6 and 7, which support the journal portion 3b positioned in the vicinity of the central portion of the work 3.

In such clamp mechanism 10, a bracket 12 is secured in an oblique manner to a movable table 11 to which the supporting portions 6 and 7 are mounted, and the bracket 12 is provided with a projection 12a projecting from the lower portion of the bracket 12. To the projection 12a is pivotally mounted one end of a clamp arm 13 having substantially an L-shape through a pin 14.

The other end of the clamp arm 13 projects over the work 3 and is provided with a front end portion to which a roller 15 for pressing the journal portions 3b from the upper side is carried to be rotatable. A lubrication oil supplied from an oil passage 13a formed in the clamp arm 13 is supplied to an outer peripheral surface of the roller 15 through an oil applying portion 16 such as felt disposed inside the clamp arm 13.

Provided at the upper end portion of the bracket 12 is a bearing portion 17, through which a shaft portion 18a of a clamp cylinder 18 is supported to be rotatable, and a front end of a piston rod 18b projected from the clamp cylinder 18 is pivotaly mounted to the clamp arm 13 through a pin 19. Accordingly, the clamp arm 13 is retired rotatably in an upper direction by rotation around the pin 14 being the center of the rotation by the reciprocal movement of the piston rod 18b.

Figure 7:
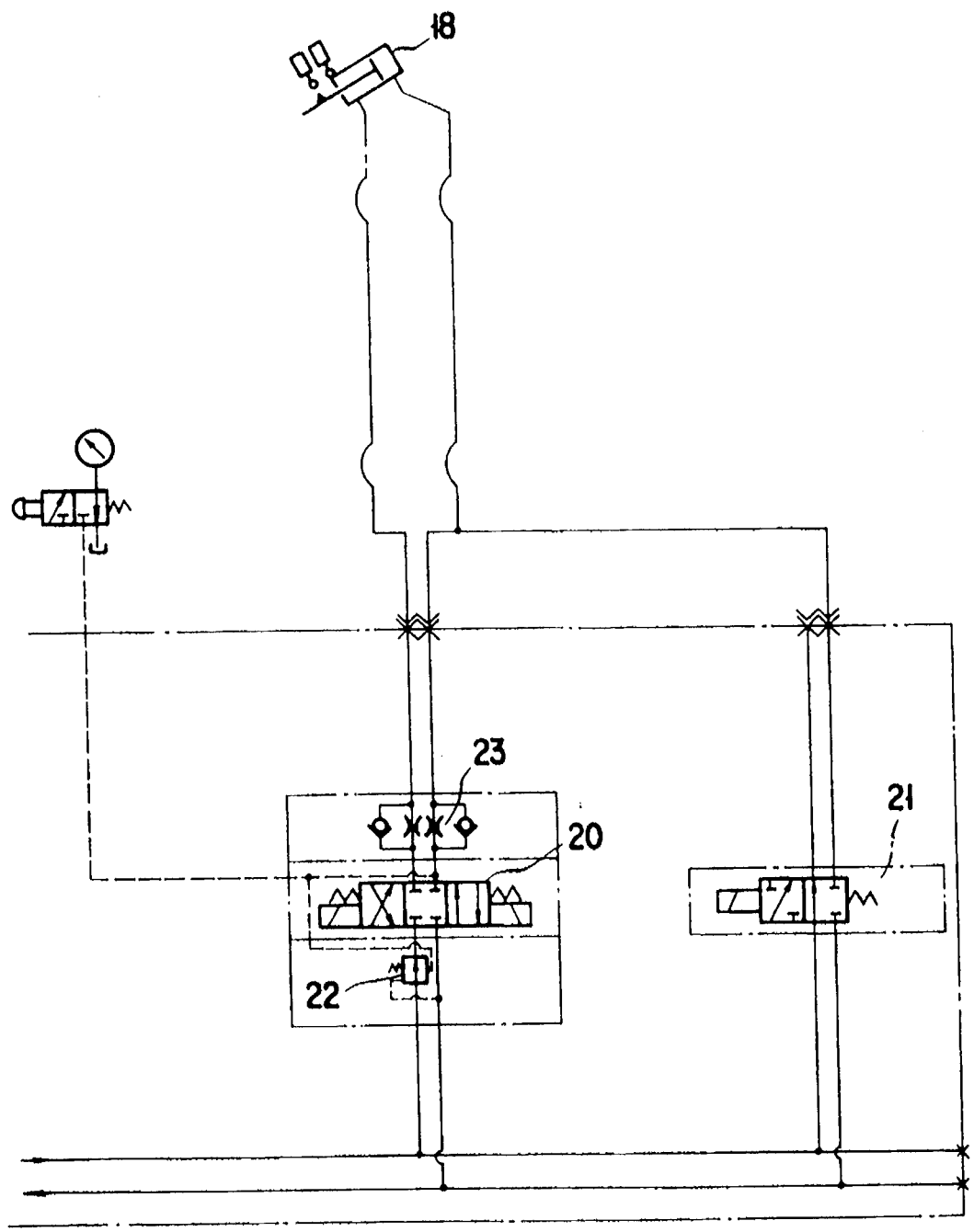
FIG. 7 is a diagram showing a hydraulic circuit for driving a clamp cylinder of the embodiment of FIG. 3.

Further, a hydraulic pressure is supplied to the clamp cylinder 18 by means of a hydraulic circuit represented by FIG. 7.

That is, an electromagnetic valve 20 for weak-clamping and an electromagnetic valve 21 for strong-clamping are provided for the hydraulic circuit, and in a case where the strong-clamping electromagnetic valve 21 is made "OFF" and the weak-clamping electromagnetic valve 20 is made "ON", a hydraulic pressure reduced in pressure by a pressure reducing valve 22 is supplied to the clamp cylinder 18 through a throttle valve 23, and on the other hand, in a case where the weak-clamping electro-magnetic valve 21 is made "OFF" and the strong-clamping electromagnetic valve 20 is made "ON", a hydraulic pressure not reduced in pressure is supplied to the clamp cylinder 18.

Figure 3:
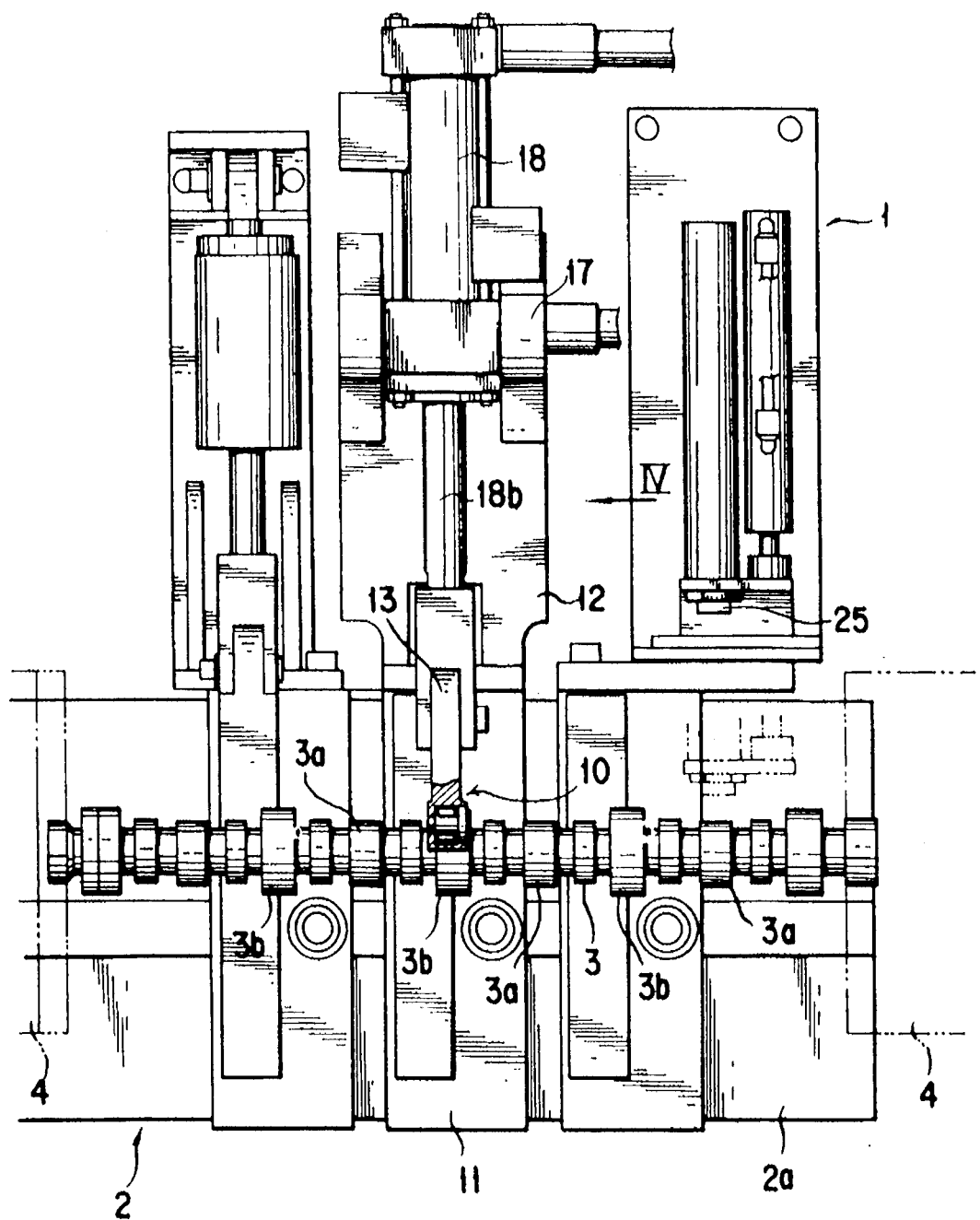
FIG. 3 is a plan view of one embodiment of a work support device of a camshaft miller according to the present invention.

Referring to FIG. 3, reference numeral 25 is a sensor for detecting bend and break of a shaft disposed side by side the clamp cylinder 18 and the shaft bend and break detection sensor 25 advances to a position shown in an image line in a necessary time to abut against the cam portion 3a of the camshaft 3 to thereby detect the bend and break of the cam shaft and index the cam top portion.

The operation of the above embodiment will be described hereunder.

First, in the time of machining the work 3, the axial height of each of the respective supporting portions 6 and 7 is adjusted to a value of a diameter of a journal portion 3b having a smaller error within tolerance.

Figure 4:
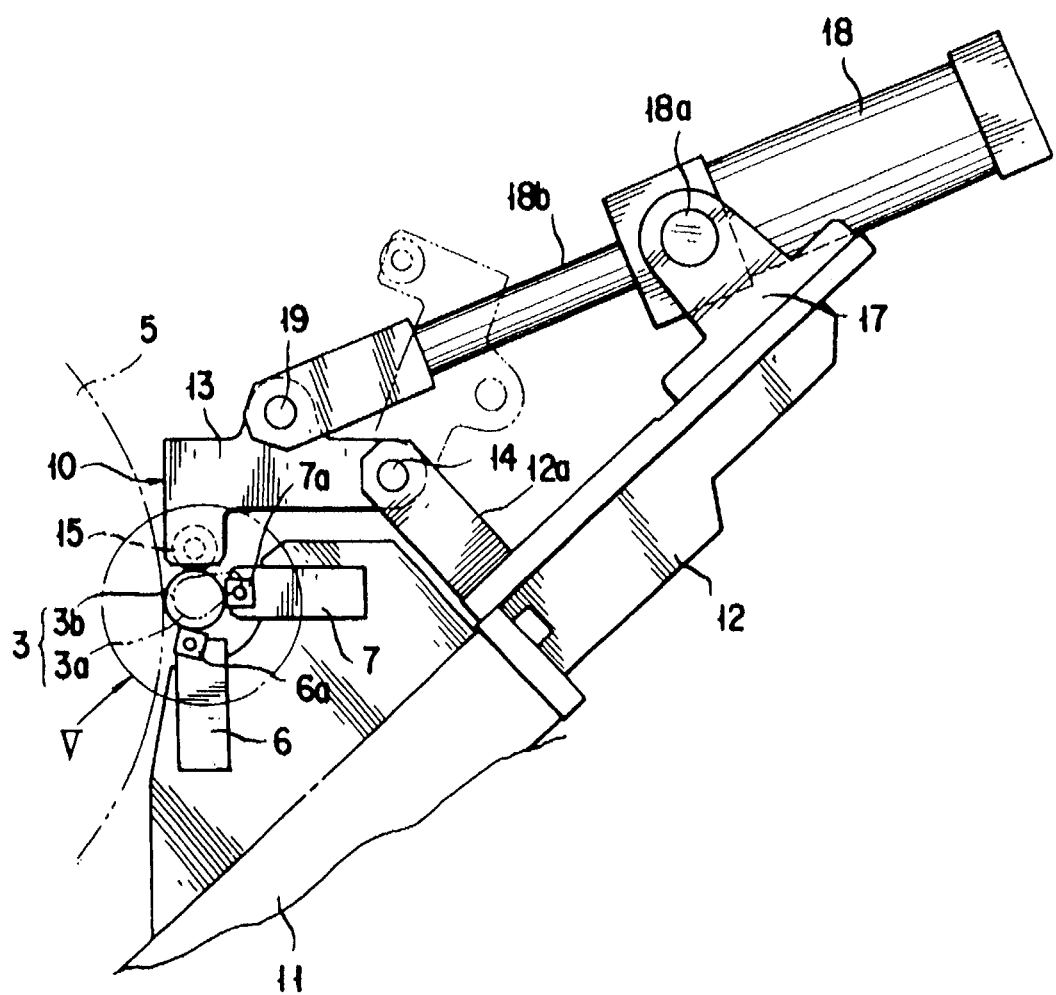
FIG. 4 is a view shown in a direction of an arrow IV in FIG. 3.

Next, a work 3 is carried in a portion between the chucks 4, 4 in a state that the clamp arm is retired by means of the clamp cylinder 18 to a portion shown by an image line in FIG. 4, and at this portion, the work 3 is subjected to the phase indexing and chucking operations. In the next step, the weak-clamping electromagnetic valve 20 is made "ON" to thereby supply the hydraulic pressure reduced in pressure by the pressure reducing valve 22 to the clamp cylinder 18 and, under the condition that the work 3 is clamped with a weak clamping force, the chucks 4 are rotated to thereby detect the shaft bend and break the shaft bend and beak detection sensor 25 and index the cam top portion. During these operation, the lubricating oil supplied to the outer periphery of the roller 15 through the oil applying portion 16 is supplied to the outer peripheral surface of the journal portion 3b and the pads 6a and 7a through the rotation of the roller 15. Further, in a time till the lubrication oil is supplied to pads 6a and 7a through the roller 15 and the journal portion 3b, the journal portion 3b slides with respect to the pads 6a and 7a, but since the clamp arm is clamped with the weak clamping force, the journal portion 3b and the pads 6a and 7a do not cause the wearing.

In the meantime, when both the end portions of the work 3 is clamped by the chucks 4, if the diameter of the journal portion 3b is a value corresponding to a larger value of an error within the tolerance, there may cause a case wherein the work 3 is pushed upward by the supporting portions 6 disposed on both sides thereof and the central portion of the work 3 is deformed upward, thereby causing a gap between the work 3 and the supporting portions 6 and 7 positioned in the vicinity of the central portion.

However, in the next step, when the strong-clamping electromagnetic valve 21 is made "ON", the hydraulic pressure not reduced is supplied to the bottom side of the clamp cylinder 18 and the journal portion 3b is pressed downward by the roller 15 provided for the front end portion of the clamp arm 13, so that the gap between the journal portion 3b and the supporting portion 6 supporting the work 3 from the lower side is eliminated. At this time, since the pad 6a of this supporting portion 6 is inclined to the side of the supporting portion 7, as shown in FIG. 5, a horizontal component F of a force pressing the work 3, i.e. reaction force, caused by the pressing force is generated, and the work 3 is forced against the supporting portion 7 by this component F of the force, so that the gap between the journal portion 3b and the supporting portion 7 is also eliminated.

In the next step, under the above described condition, the work 3 is rotated to thereby carry out the machining to the cam portion 3a of the work 3 by means of the cutter 5. However, since the work 3 can be machined under the gap eliminated condition between the supporting portions 6 and 7, this machining can be done with high accuracy and the work 3 is not substantially vibrated, thus effectively reducing the noise.

Figure 5:
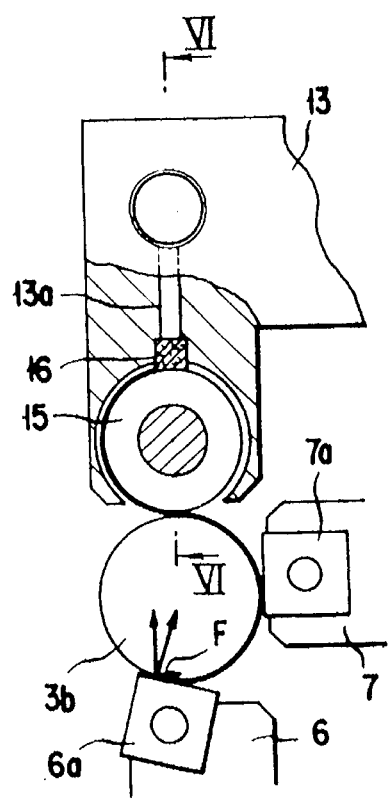
FIG. 5 is a sectional view, in an enlarged scale, of an encircled portion, partially cut away, of FIG. 4.
Figure 6:
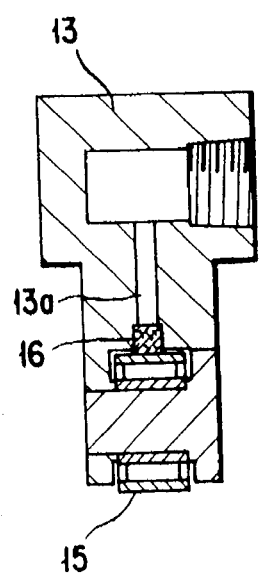
FIG. 6 is a sectional view taken along the line VI—VI of FIG. 5.

Furthermore, during the machining, the lubrication oil supplied to the outer peripheral surface of the roller by the oil applying portion 16 adheres to the outer peripheral surface of the journal portion, as shown in FIG. 5, in accordance with the rotation of the roller 15 to lubricate the sliding surface of the pads 6a and 7a, so that the journal portion 3b can be prevented from being heated and wearing even if the work 3 is rotated under the clamping condition of the journal portion 3b.

Further, in the above, although the preferred embodiment of the present invention is described, with respect to the described embodiment, it is to be noted that various modifications, eliminations and additions may be acceptable by persons skilled in the art within the subject and scope of the present invention, and accordingly, the present invention is not limited to the described embodiment and includes the scope defined by elements recited in claims and equivalency thereof.

Possibility of Industrial Usage

As described above, the work support device of the camshaft miller according to the present invention is extremely useful of the machining of a camshaft of an internal combustion engine of an automobile.

I claim:

1. A work support device of a camshaft miller in which a plurality of journal portions of a work to be machined are supported by a plurality of support portions from a lower side and a side reverse to a work milling direction, wherein supporting surfaces of the supporting portions supporting the work from the lower side thereof are inclined towards other supporting portions supporting the work from the side reverse to the milling direction and wherein a clamp mechanism having clamp arms for pressing the work from the upper side thereof is disposed above the supporting portions; and wherein a roller abutting against the work is rotatably provided for the front end of the clamp arm and an oil applying portion for coating a lubrication oil on an outer peripheral surface of the roller.

2. A work support device according to claim 1, wherein the inclination angle of the supporting surface of the supporting portion for supporting the work from the lower side will be preferred to be within a range of 10° to 20°.

3. A work support device according to claim 1, wherein hydraulic pressures of different values are supplied to a clamp cylinder for swinging the clamp arm by means of an electromagnetic valve for weak-clamping and an electromagnetic valve for strong-clamping.

4. A work support device of a camshaft miller in which a plurality of journal portions of a work to be machined are supported by a plurality of support portions from a lower side and a side reverse to a work milling direction, wherein supporting surfaces of the supporting portions supporting the work from the lower side thereof are inclined towards other supporting portions supporting the work from the side reverse to the milling direction and wherein a clamp mechanism having clamp arms for pressing the work from the upper side thereof is disposed above the supporting portions; and wherein hydraulic pressures of different values are supplied to a clamp cylinder for swinging the clamp arm by means of an electromagnetic valve for weak-clamping and an electromagnetic valve for strong-clamping.

5. A work support device according to claim 4, wherein the inclination angle of the supporting surface of the supporting portion for supporting the work from the lower side is preferably within a range of 10° to 20°.

* * * * *